US009760849B2

(12) United States Patent
Vinnakota et al.

(10) Patent No.: US 9,760,849 B2
(45) Date of Patent: Sep. 12, 2017

(54) ASSESSING AN INFORMATION SECURITY GOVERNANCE OF AN ENTERPRISE

(71) Applicant: TATA CONSULTANCY SERVICES LIMITED, Mumbai (IN)

(72) Inventors: Tirumala Rao Vinnakota, Hyderabad (IN); Narayana Guru Prasada Lakshmi Mandaleeka, Hyderabad (IN)

(73) Assignee: Tata Consultancy Services Limited, Mumbai (IN)

(*) Notice: Subject to any disclaimer, the term of this patent is extended or adjusted under 35 U.S.C. 154(b) by 504 days.

(21) Appl. No.: 14/326,368

(22) Filed: Jul. 8, 2014

(65) Prior Publication Data

US 2016/0012360 A1  Jan. 14, 2016

(51) Int. Cl.
*G06Q 10/06* (2012.01)

(52) U.S. Cl.
CPC .................. *G06Q 10/0635* (2013.01)

(58) Field of Classification Search
CPC .... G06Q 10/0635; G06Q 10/00; G06Q 40/00; G06F 21/00
See application file for complete search history.

(56) References Cited

U.S. PATENT DOCUMENTS

| 7,290,275 | B2 | 10/2007 | Baudoin et al. | |
| 8,515,795 | B2 | 8/2013 | Marrelli et al. | |
| 2009/0024663 | A1* | 1/2009 | McGovern | G06F 21/577 |

FOREIGN PATENT DOCUMENTS

EP  2637130 A1  9/2013

OTHER PUBLICATIONS

T.Vinnakota, "Systems Approach to Information Security Governance: An Imperative Need for Sustainablility of Enterprises" Dec. 16-18, 2011, pp. 1-8.*
Erik Johansson, Pontus Johnson, "Assessment of Enterprise Information Security—An Architecture Theory Diagram Definition-" Proceedings CSER Mar. 23-25, 2005, Hoboken, NJ, USA.
(Continued)

*Primary Examiner* — Brandon Hoffman
*Assistant Examiner* — Wasika Nipa
(74) *Attorney, Agent, or Firm* — Finnegan, Henderson, Farabow, Garrett & Dunner LLP

(57) ABSTRACT

Systems and methods for assessing an information security governance of an enterprise are disclosed. The method includes classifying the information security governance into a plurality of sub-information security governances. The method further comprises defining a plurality of governance focus areas and a plurality of governance control dimensions for a sub-information security governance. The method further comprises checking a compliance, by a processor, of the governance practices of users in the sub-information security governances, in the plurality of governance focus areas, and in the plurality of governance control dimensions. The method further comprises assigning weights to the plurality of governance focus areas, to the plurality of governance control dimensions, and to the sub-information security governances. The method further comprises determining a score for sub-information security governance based on the compliance and the weights.

16 Claims, 6 Drawing Sheets

(56) References Cited

OTHER PUBLICATIONS

"Information security governance: a call to action"—National Cyber Security Summit Task Force, Corporate Governance Report, 2004.
"Information Security Risk Assessment Practices of Leading Organizations"—United States General Accounting Office, Nov. 1999.
Janne Hagen "Effectiveness of Organisational Information security measures"—2013.
"Information security governance Assessment tool for higher education".
Munirul Ula, Zuraini BT Ismail and Zailani Mohamed Sidek, "A Framework for the Governance of Information Security in Banking System" Journal of Information Assurance & Cybersecurity, vol. 2011 (2011), Article ID 726196, 12 pages.

* cited by examiner

ASSESSING AN INFORMATION SECURITY GOVERNANCE OF AN ENTERPRISE

TECHNICAL FIELD

The present disclosure in general relates to information security governance. More particularly, the present disclosure relates to a system and method for assessing an information security governance of an enterprise.

BACKGROUND

Information technology (IT) has become an integral part of everyday business. With new technologies giving rise to unprecedented functionality, information technology introduces new risks and environments that may be difficult to control. Higher dependency on information technology may lead to a high impact on the business when governance aspects relating to securing information of the enterprise may not be monitored and governed. For example, a security breach of competitive confidential information in the enterprise may have high impact on the business. To avoid the security breach of any such important information, enterprises may put in place the necessary information security governance structures and processes with adequate information security measures to control users accessing the information.

Enterprises may lose resources and reputation due to risks arising from inadequate measures taken to control users associated with information security. Risks associated with information security continue to be a problem for enterprises. In order to attain effectiveness and sustainability of enterprises with today's complex IT information and non-IT information, information security measures with governance foundations may be adopted by enterprises. Information security presents a combination of several challenges, such as a technical challenge, a business challenge, and a governance challenge. These challenges maybe resolved with adequate risk management, reporting of security breaches, and accountability of all users, whether controlling the security of the information or not. Effective information security requires the enterprise to assess emerging risks and its own measures in responding to the risks. To prevent risks, the enterprises may identify the risks and occurrences of the risks that affect information security.

Information security governance includes a system comprising a set of interconnected, interrelated, and interdependent information security governance elements. The elements' interactions may be coherently organized to provide continuous assurance for the protection of information and information assets with an emphasis on effectiveness, efficiency, accountability, and responsiveness that aids business sustainability. Researchers have proposed several methods for assessing the information security of the enterprises. However, the conventional methods are ineffective in assessing the information security governance of the enterprises.

SUMMARY

This summary is provided to introduce concepts related to systems and methods for assessing an information security governance of an enterprise and the concepts are further described below in the detailed description. This summary is not intended to identify essential features of the claimed subject matter nor is it intended for use in determining or limiting the scope of the claimed subject matter.

In one implementation, a method for assessing an information security governance of an enterprise is disclosed. The method comprises classifying the information security governance into a plurality of sub-information security governances. The information security governance may be indicative of governance practices to govern security of information and information assets of the enterprise. The method further comprises defining a plurality of governance focus areas and a plurality of governance control dimensions for a sub-information security governance. The plurality of governance focus areas indicates governance areas relevant to the sub-information security governance. The plurality of governance control dimensions are indicative of governance actions required on the plurality of governance focus areas. The method further comprises checking a compliance, by a processor, of the governance practices of users a) in the sub-information security governances, b) in the plurality of governance focus areas, and c) in the plurality of governance control dimensions. The method further comprises assigning, by the processor, weights to the plurality of governance focus areas, to the plurality of governance control dimensions, and to the sub-information security governance. The method further comprises determining, by the processor, a score for each sub-information security governance in each governance focus area and in each governance control dimension based on the compliance and the weights assigned to the plurality of governance focus areas, the plurality of governance control dimensions, and to the sub-information security governances. The method further comprises calculating an aggregate score for the sub-information security governance by aggregating the score of each of the governance focus area in each of the governance control dimension based on the compliance and the weights. The aggregated score facilitates assessment of the information security governance of the enterprise.

In one implementation, a system for assessing an information security governance of an enterprise is disclosed. The system comprises a processor and a memory coupled to the processor. The processor executes a plurality of subsystems stored in the memory. The plurality of subsystems comprises a classifier to classify the information security governance into a plurality of sub-information security governances. The information security governance may be indicative of governance practices to govern security of information and information assets of the enterprise. The plurality of subsystems further comprises a definer to define a plurality of governance focus areas and a plurality of governance control dimensions for a sub-information security governance. The plurality of governance focus areas indicates governance areas relevant to the sub-information security governance. The plurality of governance control dimensions are indicative of governance actions required on the plurality of governance focus areas. The plurality of subsystems further comprises a checker to check a compliance of the governance practices of users a) in the sub-information security governances, b) in the plurality of governance focus areas, and c) in the plurality of governance control dimensions. The plurality of subsystems further comprises an assigner to assign weights to the plurality of governance focus areas, to the plurality of governance control dimensions, and to the sub-information security governances. The plurality of subsystems further comprises a determiner to determine a score for each sub-information security governance in each governance focus area and in each governance control dimension based on the compliance and the weights assigned to the plurality of governance focus areas, the plurality of governance control dimensions, and to the sub-information security governances. The determiner further calculates an aggregated score for the sub-information security governance by aggregating the score of each of the governance focus area in each of the governance control dimension based on the compliance and the weights. The aggregated score facilitates assessment of the information security governance of the enterprise.

A non-transitory computer readable medium embodying a program executable in a computing device for assessing an information security governance of an enterprise, the program causing a processor to perform instructions. The instructions include classifying the information security governance into a plurality of sub-information security governances, wherein the information security governance may be indicative of governance practices to govern security of information and information assets of the enterprise. The instructions also include defining a plurality of governance focus areas and a plurality of governance control dimensions for a sub-information security governance, wherein the plurality of governance focus areas are indicative of governance areas relevant to the sub-information security governances, and wherein the plurality of governance control dimensions are indicative of governance actions required on the plurality of governance focus areas. The instructions also include checking a compliance of the governance practices of users a) in the sub-information security governances, b) in the plurality of governance focus areas, and c) in the plurality of governance control dimensions. The instructions also include assigning weights to the plurality of governance focus areas, to the plurality of governance control dimensions, and to the sub-information security governances. The instructions also include determining a score for each sub-information security governance in each governance focus area and in each governance control dimension based on the compliance and the weights assigned to the plurality of governance focus areas, the plurality of governance control dimensions, and to the sub-information security governances. Further, the instructions include calculating an aggregated score for the sub-information security governance by aggregating the score of each of the governance focus area in each of the governance control dimension based on the compliance and the weights, wherein the aggregated score facilitates assessment of the information security governance of the enterprise.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

The present disclosure relates to systems and methods for assessing an information security governance of an enterprise. The information security governance indicates governance practices to govern security of information and information assets of the enterprise. The information security governance may be classified into a plurality of sub-information security governances. Each sub-information security governance may have a plurality of governance focus areas and a plurality of governance control dimensions defined. The plurality of governance focus areas may indicate governance areas relevant to the sub-information security governance. The plurality of governance control dimensions may be indicative of governance actions required on the plurality of governance focus areas.

It may be understood that in order to assess a security of the information present in the enterprise, one may need to assess the information security governance of an enterprise. For doing so, compliance of the governance practices of users in the sub-information security governances, in the plurality of governance focus areas, and in the plurality of governance control dimensions may be checked. In one embodiment, the compliance may be checked by presenting an Information Security governance questionnaire to the users. The user may respond to the Information security governance questionnaire presented. Subsequently, the plurality of governance focus areas, the plurality of governance control dimensions, and the sub-information security governance may be assigned weights based upon a significance of the same. In the end, based on the compliance to the governance practices and the weights assigned to the plurality of governance focus areas, the plurality of governance control dimensions, and to the sub-information security governances, a score for each sub-information security governance in each governance focus area and in each governance control dimension may be determined. The score for sub-information security governance may be aggregated for the information security governance. The aggregated score provides/facilitates assessment of the information security governance of the enterprise.

While aspects of described system and method for assessing an information security governance of an enterprise may be implemented in any number of different computing systems, environments, and/or configurations, the embodiments are described in the context of the following exemplary system.

Figure 1:
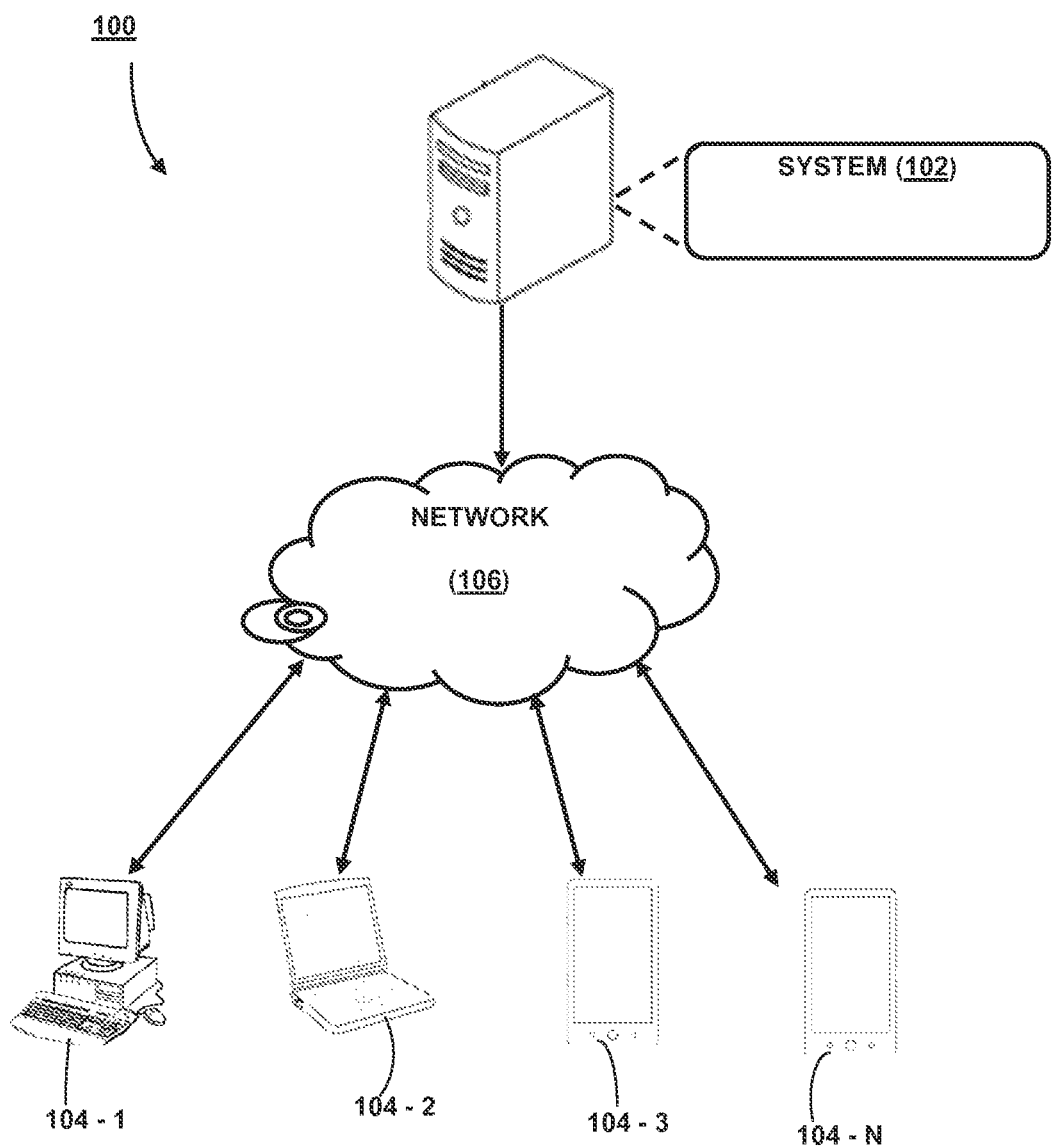
FIG. 1 illustrates a network implementation of a system for assessing an information security governance of an enterprise, in accordance with an embodiment of the present disclosure.

Referring now to FIG. 1, a network implementation 100 of a system 102 for assessing an information security governance of an enterprise is illustrated, in accordance with an embodiment of the present disclosure. The system 102 may classify the information security governance into a plurality of sub-information security governances. Each sub-information security governance may have a plurality of governance focus areas and a plurality of governance control dimensions defined. In order to assess the information security governance, the system 102 may check compliance of the governance practices of users in the enterprise. The compliance may be checked in the sub-information security governances, in the plurality of governance focus areas, and in the plurality of governance control dimensions. Subsequently, the plurality of governance focus areas, the plurality of governance control dimensions, and the sub-information security governances may be assigned weights by the system 102. The system 102 may determine a score for each sub-information security governance in each governance focus area and in each governance control dimension based on the compliance and the weights assigned to the plurality of governance focus areas, the plurality of governance control dimensions, and to the sub-information security governances. The score for each of the sub-information security governance may be aggregated for the information security governance. The aggregated score provides and/or facilitates assessment of the information security governance of the enterprise.

Although the present disclosure is explained by considering a scenario that the system 102 may be implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
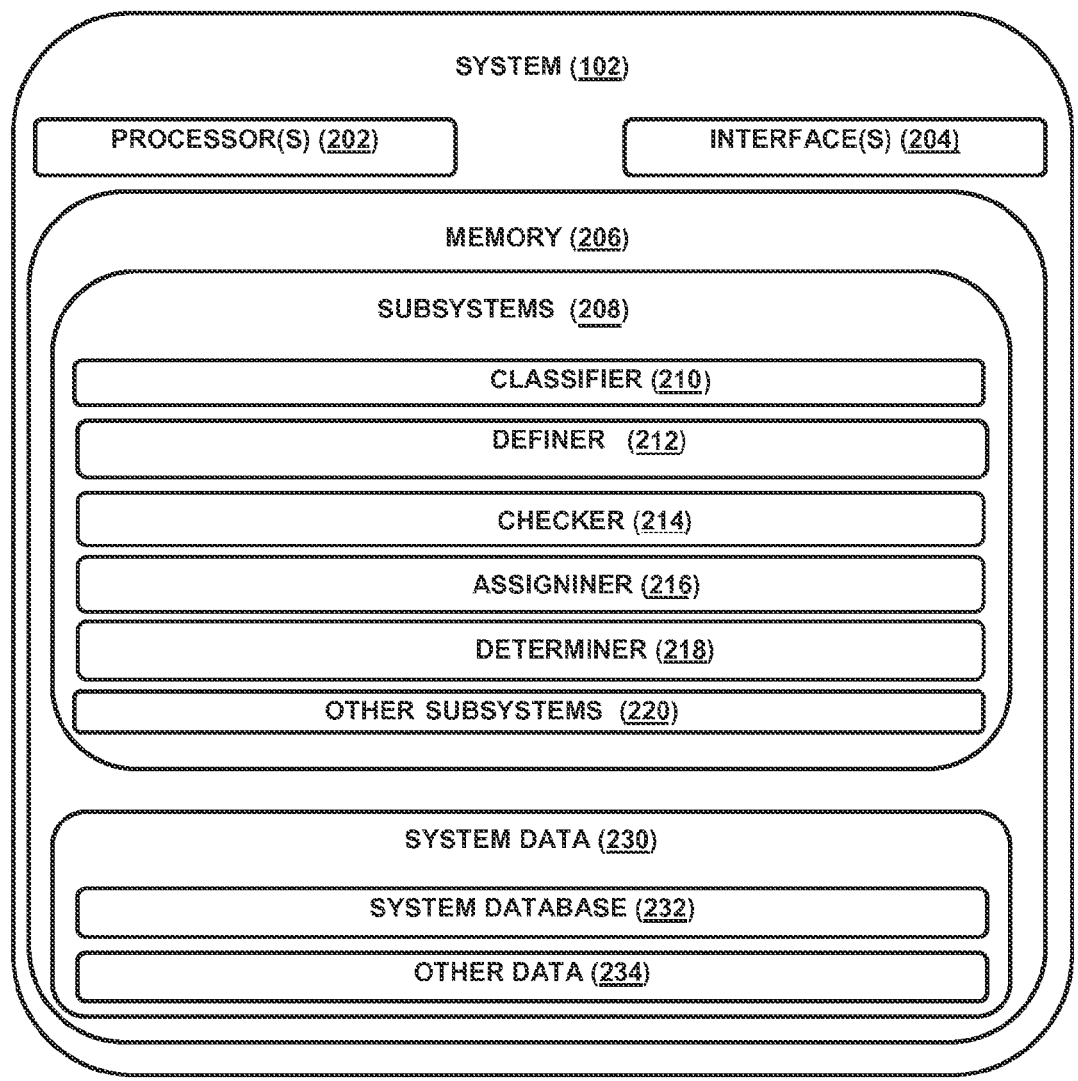
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include subsystems 208 and system data 230.

The subsystems 208 include circuitry, processors, routines, programs, objects, components, data structures, etc., which perform particular tasks or implement particular abstract data types. In one implementation, the subsystems 208 may include a classifier 210, a definer 212, a checker 214, an assigner 216, a determiner 218, and other subsystems 220. The other subsystems 220 may include processors, programs, or coded instructions that supplement applications and functions of the system 102.

The system data 230, amongst other things, serves as a repository for storing data processed, received, and generated by one or more of the subsystems 208. The system data 230 may also include a system database 232 and other data 234. The other data 234 may include data generated as a result of the execution of one or more subsystems in the other subsystems 220.

In one implementation, at first, a user may use the client device 104 to access the system 102 via the I/O interface 204. The users may include enterprise users, administrators, and security strategists in the enterprise. The working of the system 102 may be explained in detail using FIG. 2, FIG. 3A, FIG. 3B, and FIG. 3C explained below. The system 102 may be used for assessing the information security governance 302 of the enterprise. The information security governance 302 may be indicative of governance practices to govern security of information and information assets present in the enterprise. For example, in an IT enterprise, policies related to the information security, security controls that may be implemented to protect an information infrastructure, data management, and personnel responsible for managing the information may be considered in the information security governance. The information security governance 302 may also be understood as a set of responsibilities and governance practices implemented by the users of the enterprise for securing information and the information assets present in the enterprise. The information security governance 302 may provide a direction to the users to implement the governance practices. The information security governance 302 may allow the users to manage risks appropriately by continuously verifying that the enterprise's information is being used responsibly.

Figure 3A:
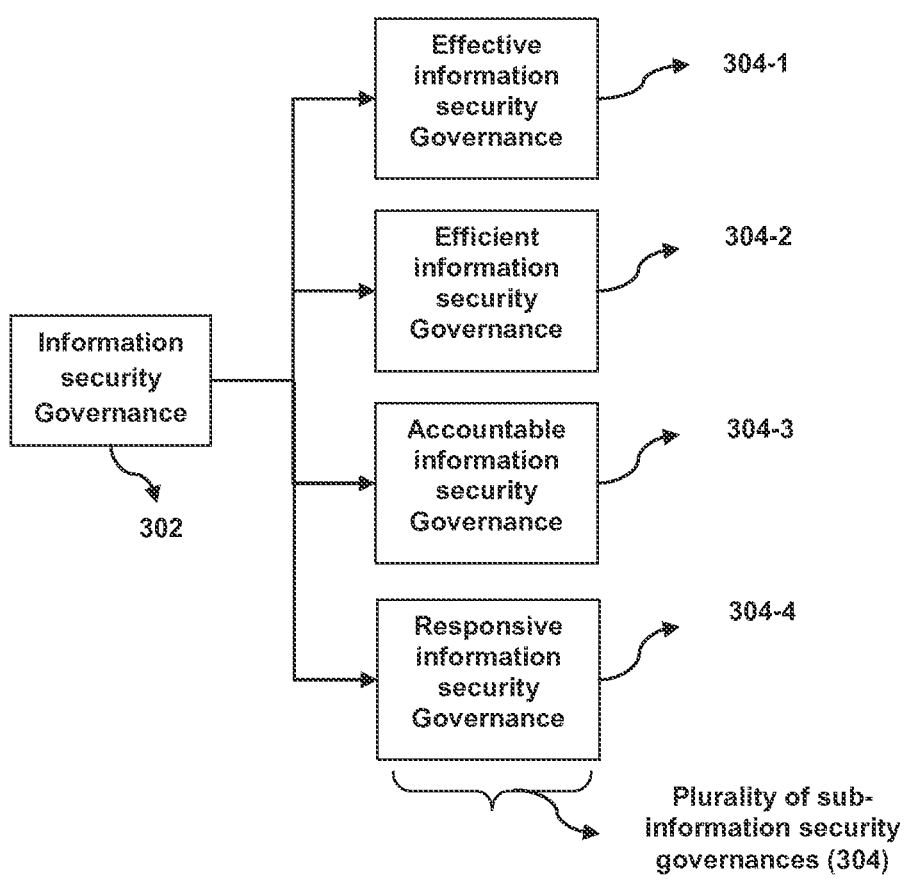
FIG. 3A illustrates classification of the information security governance into a plurality of sub-information security governances, in accordance with an embodiment of the present disclosure.
Figure 3B:
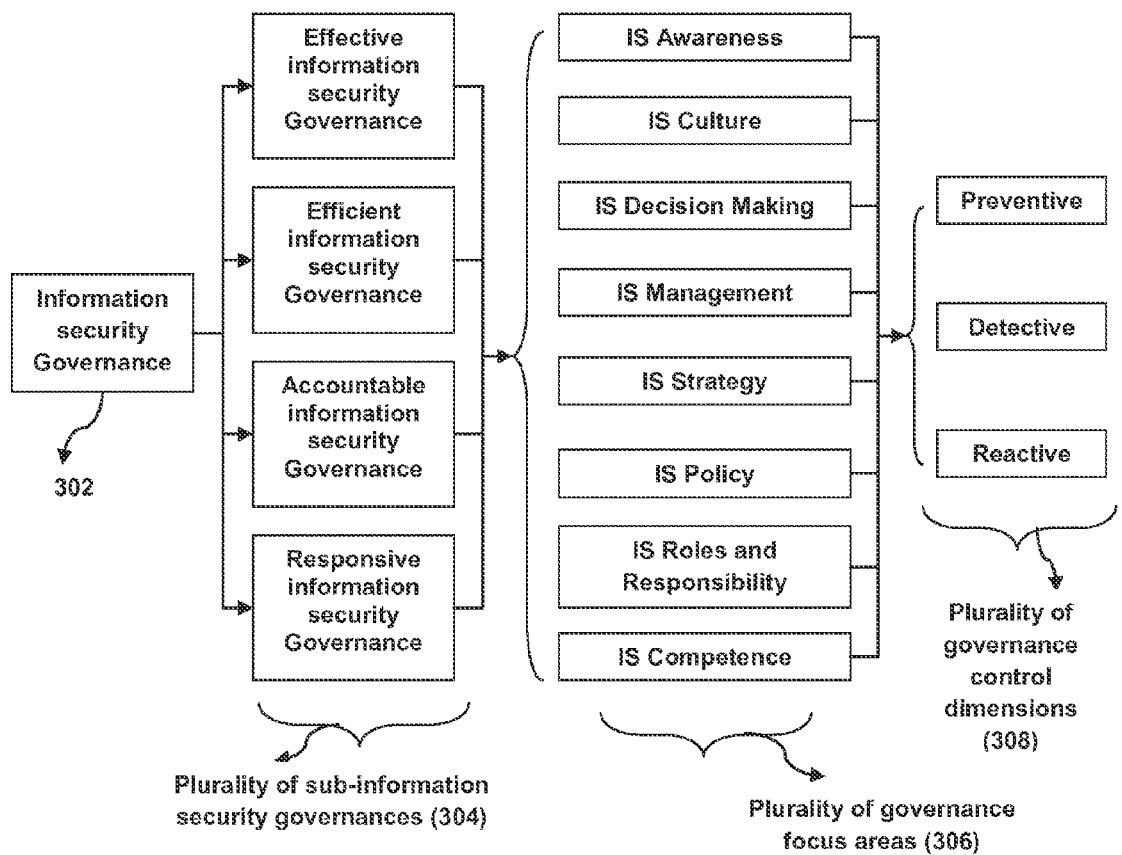
FIG. 3B illustrates defining of the sub-information security governances, a plurality of governance focus areas and a plurality of governance control dimensions, in accordance with an embodiment of the present disclosure.
Figure 3C:
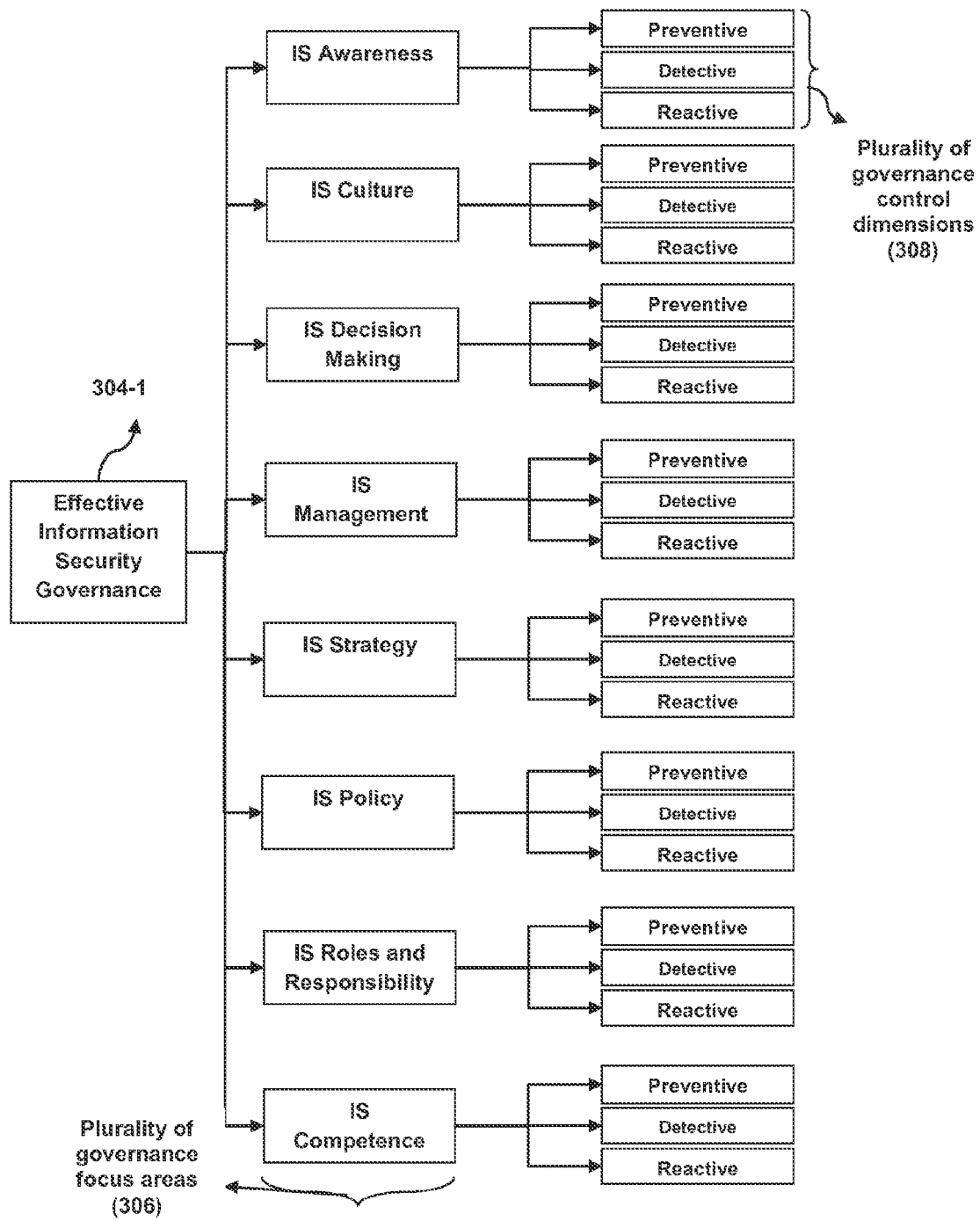
FIG. 3C illustrates effective information security governance, in accordance with an embodiment of the present disclosure.

In order to assess or evaluate the information security governance 302, the classifier 210 of the system 102, at first, may classify the information security governance 302 into a plurality of sub-information security governances 304 as shown in FIG. 3A. The information security governance 302 may be classified/categorized/broken-down to identify and to understand measures required to implement the governance practices in the enterprise. The information security governance 302 of the enterprise may be assessed in governance activities related to the information security. For example, personnel, processes, procedures, compliance activities related to the security of the information in the enterprise may be assessed. In one example, the information security governance 302 may be classified broadly to assess the personnel responsible for securing the information. In another example, the information security governance 302 may be classified to assess costs associated in complying with the governance practices. The classification may ensure identifying, monitoring, and reporting of the measures taken in the enterprise for the information security governance 302.

A sub-information security governance of the plurality of sub-information security governances 304 may comprise at least one of an effective information security governance 304-1, an efficient information security governance 304-2, an accountable information security governance 304-3, or/and a responsive information security governance 304-4. The sub-information security governance may help to assess orientation of the enterprise in at least one of the effective information security governance 304-1, the efficient information security governance 304-2, the accountable information security governance 304-3, or/and the responsive information security governance 304-4 or a combination thereof.

The effective information security governance 304-1 may indicate corrective measures that the users may take to implement the effective governance practices of securing information in the enterprise. For example, in the IT enterprise, the effective information security governance 304-1 may include the corrective measures taken by the users to mitigate risks associated with the information security. Further, the users may take the corrective measures to reduce impacts on information/resources/data of the enterprise. For example, the users/employees may use a data security tool to manage the security of information in the enterprise. The effective information security governance 304-1 may comprise a) level of involvement of the enterprise in the information security governance 302 b) degree of communication on the information security governance 302 in the enterprise c) degree of approaches developed in the enterprise to implement the information security governance 302 d) degree of directions/measures taken to provide information security governance 302 in the enterprise.

The efficient information security governance 304-2 may indicate the efficient governance practice related to investments made to secure the information in the enterprise. The efficient information security governance 304-2 ensures proportional use of the investments to secure the information. For example, in the IT enterprise, the investment made to secure the information digitally may be given high preference when compared to the investment made to store documents physically in the enterprise, if the cost of securing information digitally is less in comparison. In other words, when the measures taken by the users to secure information are not adequate, the investment may be made on an alternate solution to implement the efficient governance practices in the enterprise. The efficient information security governance 304-2 may indicate the efficient use of resources for securing the information based on risk analysis.

The accountable information security governance 304-3 may indicate accountability and responsibility of the users/administrators/employees in securing the information in the enterprise. The accountable information security governance 304-3 may include defining employee hierarchy, processes, roles and responsibilities of the employees in the enterprise for the information security governance 302. In one embodiment, the employee hierarchy may be defined with roles and responsibilities for the employees to implement the security across the enterprise. The users may be made accountable and responsible to monitor trends, issues and risks associated with the information security at regular intervals. For example, in the IT industry, an IT administrator may be accountable for monitoring spam e-mails received by the employees in the enterprise. Further, an IT manager may be accountable for reviewing the monitoring and the measures taken to monitor the spam e-mails on a weekly or monthly basis. The accountable information security governance 304-3 may correspond to legal and regulatory requirements, compliance and responsibility. The accountable information security governance 304-3 may correspond to a) use, misuse, abuse or no-use of authority, for example, security administrators b) moral and ethical orientation of the users/administrators/authorities in performing their role c) systems to enforce accountability d) realization of goals of governance in terms of content, intent, methods and their impact and e) levels and forms of accountability.

The responsive information security governance 304-4 may indicate responsiveness of the users in the enterprise for the issues related to the information security. The responsive information security governance 304-4 may indicate time taken to address the issues related to information security. For example, in the IT enterprise, for a breakdown of a network firewall in the enterprise, the time to resolve the breakdown by the users/administrators/employees may be defined. The responsive information security governance 304-4 may correspond to a) timeliness to respond to security of information and to deliver value in securing the information b) dependency to meet requirements of the security of the information.

Subsequent to the classification of the information security governance 302 into sub-information security governances 304, the system 102 may employ the definer 212 to define a plurality of governance focus areas 306 and a plurality of governance control dimensions 308 for each of the plurality of sub-information security governances 304. The plurality of governance focus areas 306 may indicate governance areas relevant to the sub-information security governances 304. The plurality of governance focus areas 306 may help the users to identify the risks in the processes or in the compliance activities of the enterprise. In one example, the plurality of governance focus areas 306 may comprise at least one of an Information Security (IS) awareness, an Information Security (IS) culture, an Information Security (IS) decision making, an Information Security (IS) management, an Information Security (IS) strategy, an Information Security (IS) policy, an Information Security (IS) roles and responsibilities, an Information Security (IS) competence, or a combination thereof. For example, the responsibility of the user in monitoring the spam e-mails that may be more relevant to the accountable information security governance 304-3 is defined or not, may be checked in order to assess the governance practices in the enterprise. The governance focus areas 306 may be used for assessing the information security governance 302 as will be explained below.

The information security (IS) awareness may include a first set of guidelines for promoting awareness to the users related to the risks associated with the information security. For example, the risks may include threats and impact on the confidentiality, or integrity, or availability of the information in the enterprise. Further, the IS awareness may also correspond to measures that the users may undertake to protect the information in the enterprise. For example, in the IT industry, the awareness regarding a policy requiring the users not to use flash drives in the enterprise may be checked.

The information security (IS) culture may include a second set of guidelines for promoting socio-cultural practices that support the measures taken by the users in the enterprise to secure information. The second set of guidelines may list down the processes and practices that may be followed in the enterprise for ensuring security of the information. For example, the second set of guidelines or the socio-cultural practices may include a policy/rule preventing an employee from sharing the information with a third party that is not authorized to receive such information.

The information security (IS) decision making may correspond to a third set of guidelines corresponding to decisions made by the users to avoid the risks in the enterprise. For example, in the IT enterprise, consider a breakdown in a user network firewall giving rise to the risks. The user may decide to use an alternate user network firewall to avoid the risks. The decision made by the user to avoid the risks may be checked. The information security (IS) management may include a fourth set of guidelines for the measures the users need to implement to ensure management of the risks. For example, in the IT enterprise, the information may be stored in a data warehouse. The users may take measures to adequately protect the information in the data warehouse. The information security management may ensure that there is no loss of the information in the data warehouse. The measures taken may ensure the users to identify where, and to what degree, the practices may be at risk.

The information security (IS) strategy may include a fifth set of guidelines for mitigating the risks associated with the information security while complying with a legal, or an internal requirement for securing the information. The information security strategy may require a decision to protect the information in the enterprise. For example, the information related to the users/employee may be given a priority for protection. The information security strategy may define a level of protection required for the information. For example, in the IT industry, an access to confidential information may be restricted to the users based on privileges defined in the enterprise.

The information security (IS) policy may include a sixth set of guidelines for indicating a set of policies that the users may have to comply with rules and guidelines related to the information security. For example, consider that in the IT enterprise, a guideline requires the users to report to the IT manager in case of a breakdown in the user network firewall. The compliance of the user adhering to the guidelines during the breakdown may be checked.

The information security (IS) roles and responsibilities may include a seventh set of guidelines corresponding to the roles and the responsibilities assigned to the users/employees to secure the information in the enterprise. For example, in the IT industry, the IT administrator may be responsible for monitoring spam e-mails received by the users in the enterprise.

The information security (IS) competence may include an eighth set of guidelines corresponding to the measures taken by the users to develop the governance practices of the information security in the enterprise. The information security competence may correspond to assessment of skills and knowledge acquired by the users for securing the information in the enterprise. For example, in the IT enterprise, the knowledge and skills of the IT administrator reporting the spam e-mails may be checked.

After the governance focus areas are defined for each of the sub-information security governances 304, the definer 212 may define the plurality of governance control dimensions 308 for each of the governance focus areas 306. The plurality of governance control dimensions may indicate governance actions that may be required to be performed on each of the governance focus areas 306. In one example, the plurality of governance control dimensions 308 may comprise a preventive dimension, a detective dimension, and a reactive dimension or a combination thereof. For example, the preventive dimension may comprise measures that a user needs to take to control the spam e-mails, such as accessing and registering of un-authorized/un-authentic websites giving e-mail address that may be more relevant to the accountable information security governance 304-3.

The preventive dimension may comprise a set of preventive guidelines for the users to take preventive measures related to the governance focus areas 306 for protecting the information. For example, the governance focus area 306, comprising information security awareness, the preventive dimension may be awareness on how to prevent the risks associated in securing the information. For example, in the IT industry, awareness on how to use and configure a user network firewall may be a preventive awareness measure to prevent the risks to secure the information.

The detective dimension may comprise a set of detective guidelines for the users related to the governance focus areas 306 to detect risks associated with security of the information. For example, for the governance focus area 306, comprising information security awareness, the detective dimension may be awareness on how to detect the risks associated with the security of information. For example, in IT industry, awareness on how to detect the computer viruses using the computer virus scan tool may be a detective awareness measure to detect the risks to secure the information.

The reactive dimension may comprise a set of reactive guidelines for the users related to the governance focus areas 306 to react to the risks associated with security of the information. For example, for the governance focus area 306, comprising information security awareness, the reactive dimension may be awareness on how to react to the risks associated with the security of information. For example, in IT industry, awareness on how to react to the computer viruses that have infected the computer machine by way of removing them using computer virus removal tool may be a reactive awareness measure to react to the risks to the security of information.

In order to understand the sub-information security governance 304, the governance focus areas 306, and the governance control dimensions 308 better, Table 1 may be used as an example. Specifically, Table 1 shows the plurality of governance focus areas 306 and the plurality of governance control dimensions 308 for the effective information security governance 304-1.

TABLE 1

Governance focus areas and governance control dimensions defined for effective information security governance 304-1
Enterprise
Information security Governance (302)

| Sub-information security Governance (304) | Governance Focus Areas (GFA) (306) | Governance Control Dimensions(GCD) (308) | | |
|---|---|---|---|---|
| | | Preventive | Detective | Reactive |
| Effective IS Governance (304-1) | IS Awareness<br>IS Culture<br>IS Decision Making<br>IS management<br>IS strategy<br>IS Policy<br>IS Roles and responsibility<br>IS Competence | | | |

After defining the governance focus areas 306 and the governance control dimensions 308 for each sub-information security governance 304, the system 102 may employ the checker 214 for checking the compliance of the governance practices of the users in the enterprise in each governance focus area and in governance each control dimension. In one example, the compliance of the governance practices with the guidelines defined in the governance focus areas 306 may be checked using an information security governance questionnaire. The information security governance questionnaire may be presented by the checker 214 to the employees/users in order to check the compliance to the information security governance practices and to evaluate the risks related to the information security in the enterprise. For example, the information security governance questionnaire may be presented to the users on the governance practices to secure the information. The evaluation of the risks may assist in reporting and understanding the risks and the areas where the users are complying or defaulting with the governance practices. The questions in the information security governance questionnaire may include—a) for the enterprise to be responsive to the information security, does the enterprise have the information security preventive awareness responsive measures in practice, b) for the enterprise to be responsive to the information security, does the enterprise have the information security preventive competence responsive measures in practice and c) for the enterprise to be responsive to the information security, does the enterprise have the information security preventive policy responsive measures in practice. Similarly, the information security governance questionnaire may be presented to the users for each of the sub-information information governances 304, for each of the plurality of governance focus areas 306, and for each of the plurality of governance control dimensions 308 in order to assess the overall information security governance of the enterprise.

Further, based upon the information security governance questionnaire, the checker 214 may receive responses, via the I/O interface 204, from the users/employees. The responses may indicate a degree of the compliance of the governance practices of the users in the enterprise that are indicative of information security governance practices of the enterprise. For example, consider the information security governance questionnaire for the responsive information security governance 304-4, with respect to a governance focus area i.e. the IS awareness in a control dimension i.e., the preventive dimension. The answers for question may be received as (a) the users/employees complying with the governance practices, (b) the users/employees not complying with the governance practices. Further, the answers for question may be received as the users complying with the governance practices partially when the degree of the compliance may be checked using the responses by the users.

In one example, the checker 214 may also determine a value based on the responses received from the user/employee. The value may indicate the compliance of the practice of the user. In one embodiment, the responses may be received from a user/employee. In another embodiment, the responses may be received from two or more users/employees. For the responses received from two or more users/employees, an average may be obtained to determine the value based on the responses. For example, for a question related to the IS awareness for the responsive information security governance 304-4, the response of the user may suggest whether the user complies with the governance practices or not.

After receiving the responses from the users, the checker 214 may determine the value for the responses. In one example, the checker 214 may compare the value with a reference value. The reference value may indicate a maximum value for the response received from the users corresponding to the compliance. In one example, the reference value may be determined as 1 (one) for the compliance. A value, 0 (zero), may be determined for the response received from the user for not complying with the governance practices in the enterprise. Similarly, a value, 1 (one), may be determined for the response received from the user for complying with the governance practices. The value 1 (one) and 0 (zero) may be compared with the reference value 1 (one) to check the compliance.

In order to understand determination of the value for the responses, Table 2 may be used as an example. Specifically, Table 2 shows the plurality of governance focus areas 306 and the plurality of governance control dimensions 308 for the effective information security governance 304-1. Table 2 shows an example for checking the compliance by the checker 214 based on the responses from the users.

TABLE 2

Checking of compliance based on the responses received from the users/employees
Enterprise
Information security Governance (302)

| Sub-information security Governance (304) | Governance Focus Areas (GFA) (306) | Governance Control Dimensions (GCD) (308) | | |
|---|---|---|---|---|
| | | Preventive | Detective | Reactive |
| Effective IS Governance (304-1) | IS Awareness IS Culture IS Decision Making IS Management IS Strategy IS Policy IS Roles and Responsibility IS Competence | 1 | 1 | 0 |

In one example, referring to Table 2, consider that the checker 214 presents the information security governance questionnaire to the users for checking the compliance in the effective information security governance 304-1, in the information security management and the preventive dimension. For example, the checker 214 may present these questions to the user/employees—a) for the enterprise to be effective in the information security, does the enterprise have the information security preventive management measures, b) for the enterprise to be effective to the information security, does the enterprise have the information security detective management measures and c) for the enterprise to be effective to the information security, does the enterprise have the information security reactive management measures. In one example, consider that the checker 214 may receive the responses from the user/employee as 1, 1 and 0, for the preventive dimension, the detective dimension and the reactive dimension respectively. Table 2 shows checking the compliance based on the responses for the information security governance questionnaire presented to the users.

In another example, the value may be determined by rating the responses received from the user. The responses may be rated in a range of 0.2 to 1. In other words, the responses may be rated based on the degree of the compliance of the governance practices of the users in the enterprise. The value may be determined in the range of 0.2 (Strongly disagree), or 0.4 (disagree), or 0.6 (somewhat agree), or 0.8 (agree), or 1 (Strongly agree) for the responses received from the user. The value, 0.2, may indicate the users not complying with the governance practices in the enterprise. The value, 0.6, may indicate the users complying partially with the governance practices in the enterprise. The value, 1, may indicate the users complying with the governance practices in the enterprise. As explained above, the value may be compared with the reference value. For example, consider the reference value as 1 (one) to check the compliance with the governance practices in the enterprise. The values 0.2, or 0.4, or 0.6, or 0.8, or 1, based on the response, may be compared with the reference value 1 (one).

In order to understand checking the compliance based on the degree determined for the responses received from the users/employees, Table 3 may be used as an example. Specifically, Table 3 shows an example for checking the compliance by the checker 214 based on the responses from the users/employees.

TABLE 3

Checking of compliance based on the responses received from the users/employees
Enterprise
Information security Governance (302)

| Sub-information security Governance (304) | Governance Focus Areas (GFA) (306) | Governance Control Dimensions (GCD) (308) | | |
|---|---|---|---|---|
| | | Preventive | Detective | Reactive |
| Effective IS Governance (304-1) | IS Awareness IS Culture IS Decision Making IS Management IS Strategy IS Policy IS Roles and Responsibility IS Competence | 0.6 | 0.8 | 1 |

In order to understand checking the compliance using Table 3, consider that the checker 214 presents the information security governance questionnaire to the users/employees for checking the compliance in the effective information security governance 304-1, in the information security decision making (governance focus area 306) and in the preventive dimension (governance control dimension 308). For example, the question—for the enterprise to be effective to the information security, does the enterprise have the information security preventive decision making measures may be presented to the user by the checker 214. Similarly, the information security governance questionnaire corresponding to the detective dimension and the reactive dimension for each of the governance focus areas 306 may be presented to the users in the enterprise. Consider that the value may be determined in the range of 0.2 to 1 for checking the compliance. For the information security governance questionnaire presented, consider the checker 214 receives the responses from the user as 0.6, 0.8 and 1 for the preventive dimension, the detective dimension and the reactive dimension respectively. Table 3 shows checking the compliance based on the responses for the information security governance questionnaire.

After checking the compliance, the system 102 may employ the assigner 216 to assign weights to the plurality of governance focus areas 306, the plurality of governance control dimensions 308, and the sub-information security governances 304. The weights may be assigned to the sub-information security governances 304 based on a priority/significance defined by the users/employees. In one example, the effective information security governance 304-1 may be assigned more weight than the efficient information security governance 304-2. Similarly, the information security strategy may be assigned with more weight than the information security awareness in the plurality of governance focus areas 306. Similarly, the preventive dimension may be assigned more weight than the reactive dimension in the plurality of governance control dimensions 308. Further, assigning the weight with variation may help to assess orientation of the enterprise in at least one of—the effective information security governance 304-1, the efficient information security governance 304-2, the accountable information security governance 304-3, or/and the responsive information security governance 304-4 or a combination thereof. Further, assigning the weight and assessment may help to compare a state of the information security governance 302 of the enterprise with various other enterprises' information security governance scores.

In order to understand assigning the weights, Table 4 may be used as an example. Table 4 shows assigning the weights to the plurality of governance focus areas 306, to the plurality of governance control dimensions 308, and to the sub-information security governances 304.

TABLE 4

Assigning weights to governance focus areas 306, governance control dimensions 308, and to the sub-information security governances 304.
Enterprise
Information security Governance (302)

| Sub-information security Governance (304) | | Governance Focus Areas (GFA) (306) | | Governance Control Dimensions (GCD) (308) | | | Total score |
|---|---|---|---|---|---|---|---|
| | | | | | Preventive | Detective | Reactive | |
| Weight | | Weight (20) | | Weight (05) | 2 | 2 | 1 |
| Effective IS Governance (304-1) | 4 | IS Awareness | 1 | Maximum Value = 100 (20(GFA)*5(GCD)) | | | |
| | | IS Culture | 1 | | | | |
| | | IS Decision Making | 3 | | | | |
| | | IS Management | 3 | | | | |
| | | IS Strategy | 4 | | | | |
| | | IS Policy | 4 | | | | |
| | | IS Roles and Responsibility | 2 | | | | |
| | | IS Competence | 2 | | | | |
| | | Aggregated Score for Effective IS Governance | | | | | |
| Weight | | Weight (10) | | Weight (10) | 2 | 6 | 2 |
| Efficient IS Governance (304-2) | 2 | IS Awareness | 1 | Maximum Value = 100 (10(GFA)*10(GCD)) | | | |
| | | IS Culture | 1 | | | | |
| | | IS Decision Making | 1 | | | | |
| | | IS Management | 2 | | | | |
| | | IS strategy | 1 | | | | |
| | | IP Policy | 1 | | | | |
| | | IS Roles and responsibility | 1 | | | | |
| | | IS Competence | 2 | | | | |
| | | Aggregated Score for Efficient IS Governance | | | | | |

From the Table 4, the plurality of governance focus areas 306 comprise the information security strategy and the information security competence having the weight of 4 and 2 respectively for the effective information security governance 304-1. Similarly, the plurality of governance control dimensions 308 comprises the preventive dimension and the reactive dimension having the weight of 2 and 1 respectively. Further, the sub-information security governance 304 comprises the effective information security governance 304-1 and the efficient information security governance 304-2 having the weight of 4 and 2 respectively.

After checking the compliance and assigning the weights to the plurality of governance focus areas 306, to the plurality of governance control dimensions 308, and to the sub-information security governances 304, the system 102 may employ the determiner 218 to determine a score. The determiner 218 may determine the score for each governance focus area 306 in each governance control dimension 308 based on the compliance and the weights assigned to the plurality of governance focus areas 306, the plurality of governance control dimensions 308, and to the sub-information security governances 304. The score determined based on the compliance and the weights may facilitate assessment of the information security governance 302 in the enterprise. Determining the score based on the compliance and the weights assigned to the plurality of governance focus areas, the plurality of governance control dimensions, and to the sub-information security governances may be explained with the help of Table 2, Table 4, and Table 5.

shown in Table 2 and Table 4. The determiner 218 may determine the score as (4*3*2*1) based on the compliance and the weights. The determiner 218 may determine the score by considering the weights assigned to each of the governance focus areas 306, to each of the governance control dimensions 308, to each of the sub-information security governances 304 and the value determined based on the compliance. Referring to Table 5, the determiner 218 may determine the score for information security preventive management measures for the effective information security 304-1 as 24. Similarly, the determiner 218 may determine the score for the detective dimension and the reactive dimension for each of the governance focus areas 306 in the

TABLE 5

Determination of the score for each governance focus area in each governance control dimension based on the compliance and the weights assigned to the plurality of governance focus areas 306, the plurality of governance control dimensions 308, and to the sub-information security governances 304.
Enterprise
Information security Governance (302)

| Sub-information security Governance (304) | | Governance Focus Areas (GFA) (306) | | Governance Control Dimensions (GCD) (308) | | | | |
|---|---|---|---|---|---|---|---|---|
| | | | | | Preventive | Detective | Reactive | Total |
| | Weight | | Weight | Weight | 2 | 2 | 1 | score |
| Effective IS Governance (304-1) | 4 | IS Awareness | 1 | Maximum Value = 100 (20(GFA)*5(GCD)) | | | | |
| | | IS Culture | 1 | | | | | |
| | | IS Decision Making | 3 | | | | | |
| | | IS Management | 3 | | 4*3*2*1 = 24 | 4*3*2*1 = 24 | 4*3*1*0 = 0 | 24 + 24 + 0 = 48 |
| | | IS strategy | 4 | | | | | |
| | | IS Policy | 4 | | | | | |
| | | IS Roles and responsibility | 2 | | | | | |
| | | IS Competence | 2 | | | | | |
| | | Aggregated Score for Effective IS Governance | | | | | | |

In order to understand the determination of the score, Table 5 may be used as an example. The determiner 218 may determine the score for each governance focus area in each governance control dimension based on the compliance and the weights assigned to the plurality of governance focus areas 306, the plurality of governance control dimensions 308, and to the sub-information security governances 304. For the question—for the enterprise to be effective to the information security, does the enterprise have the information security preventive management measures; consider the checker 214 receives the response from the user/employee as 1. From the Table 4, the weights assigned for the effective information security governance 304-1, the information security management, and the prevention dimension may be 4, 3 and 2 respectively. The determiner 218 may determine the score for each sub-information security governance in each governance focus area in governance each control dimension based on the compliance and the weights as effective information security governance 304-1 based on the compliance and the weights.

It is to be understood that the determiner 218 may determine the score for the sub-information governances 304 as explained above for the plurality of governance focus areas 306 and for the plurality of governance control dimensions 308. Referring to Table 5, the score determined by the determiner 218 may be illustrated in Table 6, as an example. Table 6 shows the score for each governance focus area in the governance control dimensions 308 for the sub-information security governances 304. After determining the score for each governance focus area in the governance control dimensions 308 for the sub-information security governances 304, the system 102 may employ the determiner 218 to calculate an aggregated score. The aggregated score may be calculated by aggregating the score of each of the governance focus areas 306 and in the plurality of governance control dimensions 308 for the sub-information governances 304.

TABLE 6

Determination/Calculation of the aggregated score for the sub-information security governance 304.
Enterprise
Information security Governance (302)

| Sub-information security Governance (304) | | Governance Focus Areas (GFA) (306) | | | Governance Control Dimensions (GCD) (308) | | | Total |
|---|---|---|---|---|---|---|---|---|
| | | | | | Preventive | Detective | Reactive | |
| | Weight | | Weight | Weight | 2 | 2 | 1 | score |
| Effective IS Governance (304-1) | 4 | IS Awareness | 1 | Maximum Value = 100 (20(GFA)*5(GCD)) | 4*1*2*1 = 8 | 4*1*2*0 = 0 | 4*1*1*1 = 4 | 8 + 0 + 4 = 12 |
| | | IS Culture | 1 | | 4*1*2*1 = 8 | 4*1*2*1 = 8 | 4*1*1*1 = 4 | 8 + 8 + 4 = 20 |
| | | IS Decision Making | 3 | | 4*3*2*1 = 24 | 4*3*2*1 = 24 | 4*3*1*0 = 0 | 24 + 24 + 0 = 48 |
| | | IS management | 3 | | 4*3*2*1 = 24 | 4*3*2*1 = 24 | 4*3*1*1 = 12 | 24 + 24 + 12 = 60 |
| | | IS strategy | 4 | | 4*4*2*1 = 32 | 4*4*2*1 = 32 | 4*4*1*1 = 16 | 32 + 32 + 16 = 80 |
| | | IP Policy | 4 | | 4*4*2*1 = 32 | 4*4*2*1 = 32 | 4*4*1*1 = 16 | 32 + 32 + 16 = 80 |
| | | IS Roles and responsibility | 2 | | 4*2*2*1 = 16 | 4*2*2*1 = 16 | 4*2*1*1 = 8 | 16 + 16 + 8 = 40 |
| | | IS Competence | 2 | | 4*2*2*0 = 0 | 4*2*2*1 = 16 | 4*2*1*1 = 8 | 0 + 16 + 8 = 24 |
| | | | | Aggregated Score for Effective IS Governance | | | | 364 |

After calculating the aggregated score, the system 102 may employ the determiner 218 to compare the aggregated score with a reference score. The reference score may indicate a maximum score that the sub-information security governances 304 may obtain by complying with the governance practices in the enterprise. The reference score may be determined using the compliance and the weights in plurality of governance focus areas 306, in the plurality of governance control dimensions 308, and in the sub-information security governances 304. Considering the example of Table 6, the reference score may be determined as (4*20*5*1), i.e. 400. The reference score comprising 4, 20, 5 and 1 indicate the weight assigned to the effective information security governance 304-1, to the plurality of governance focus areas 306, and to the governance control dimensions 308 and the maximum value obtained for the compliance respectively. From the example shown in Table 6, the aggregated score may be calculated and may be presented as 364. The aggregated score, i.e. 364 may be compared with the reference score i.e. 400 to assess the sub-information security governance 304, i.e. the effective information security governance 304-1. The reference score may vary for each of the sub-information security governances 304 based on the weights assigned. For example, referring to the Table 4, based on the weights assigned for the efficient information security governance 304-2, the reference score may be determined as 200. The reference score comprising 2, 10, 10 and 1 indicate the weight assigned to the efficient information security governance 304-2, to the plurality of governance focus areas 306, and to the governance control dimensions 308 and the maximum value obtained for the compliance respectively. Similarly, the reference scores for the accountable information security governance 304-3 and the responsive information security governance 304-4 may be determined based on the weights assigned respectively.

It is to be understood that using the description detailed above, the information security governance 302 of the enterprise may be assessed by considering the plurality of sub-information security governances 304, the plurality of governance focus areas 306, the plurality of governance control dimensions 308. By referring to the example shown in Table 6, the information security governance 302 for the enterprise may be assessed using the description provided above. The information security governance 302 may be assessed using Table 7, for the enterprise using the explanation provided above. In order to assess overall information security governance 302, the aggregated score for each of the sub-information security governances 304 may be aggregated to obtain an overall score for the enterprise. In other words, the aggregated score of the effective information security governance 304-1, the aggregated score of the efficient information security governance 304-2, the aggregated score of the accountable information security governance 304-3, and the aggregated score of the responsive information security governance 304-4 may be aggregated to obtain the overall score for the enterprise. Upon obtaining the overall score, the overall score may be compared with a standard score. The standard score may indicate a maximum score the enterprise may obtain upon complying with the governance practices. For the above example, the standard score may be determined as 1000, i.e., by aggregating the reference score of each of the sub-information security governances 304.

TABLE 7

Assessment of the information security governance
Enterprise
Information security Governance (302)

| Sub-information security Governance (304) | | Governance Focus Areas (GFA) (306) | | | Governance Control Dimensions (GCD) (308) | | | Total |
|---|---|---|---|---|---|---|---|---|
| | | | | | Preventive | Detective | Reactive | score |
| | Weight | | Weight (20) | Weight (05) | 2 | 2 | 1 | |
| Effective IS Governance (304-1) | 4 | IS Awareness | 1 | Maximum Value = 100 (20(GFA)*5(GCD)) | | | | |
| | | IS Culture | 1 | | | | | |
| | | IS Decision Making | 3 | | | | | |

TABLE 7-continued

Assessment of the information security governance Enterprise
Information security Governance (302)

| Sub-information security Governance (304) | | Governance Focus Areas (GFA) (306) | | | Governance Control Dimensions (GCD) (308) | | | Total score |
|---|---|---|---|---|---|---|---|---|
| | | | | | Preventive | Detective | Reactive | |
| | | IS Management | 3 | | | | | |
| | | IS strategy | 4 | | | | | |
| | | IS Policy | 4 | | | | | |
| | | IS Roles and responsibility | 2 | | | | | |
| | | IS Competence | 2 | | | | | |
| | | Aggregated Score for Effective IS Governance | | | | | | |
| Weight | | Weight (10) | | Weight (10) | 2 | 6 | 2 | |
| Efficient IS | 2 | IS Awareness | 1 | | | | | |
| | | IS Culture | 1 | | | | | |
| | | IS Decision Making | 1 | | | | | |
| | | IS Management | 2 | | | | | |
| | | IS strategy | 1 | | | | | |
| | | IS Policy | 1 | | | | | |
| | | IS Roles and responsibility | 1 | | | | | |
| | | IS Competence | 2 | | | | | |
| | | Aggregated Score for Efficient IS Governance | | | | | | |
| Weight | | Weight (20) | | Weight (05) | 2 | 1 | 2 | |
| Accountable IS Governance (304-3) | 2 | IS Awareness | 2 | Maximum Value = 100 (20(GFA)*5(GCD)) | | | | |
| | | IS Culture | 4 | | | | | |
| | | IS Decision Making | 2 | | | | | |
| | | IS Management | 2 | | | | | |
| | | IS strategy | 2 | | | | | |
| | | IS Policy | 2 | | | | | |
| | | IS Roles and responsibility | 4 | | | | | |
| | | IS Competence | 2 | | | | | |
| | | Aggregated Score for Accountable IS Governance | | | | | | |
| Weight | | Weight (10) | | Weight (10) | 2 | 4 | 4 | |
| Responsive | 2 | IS Awareness | 2 | | | | | |
| | | IS Culture | 1 | | | | | |
| | | IS Decision Making | 2 | | | | | |
| | | IS Management | 1 | | | | | |
| | | IS strategy | 1 | | | | | |
| | | IS Policy | 1 | | | | | |
| | | IS Roles and responsibility | 1 | | | | | |
| | | IS Competence | 1 | | | | | |
| | | Aggregated Score for Responsive IS Governance | | | | | | |

Figure 4:
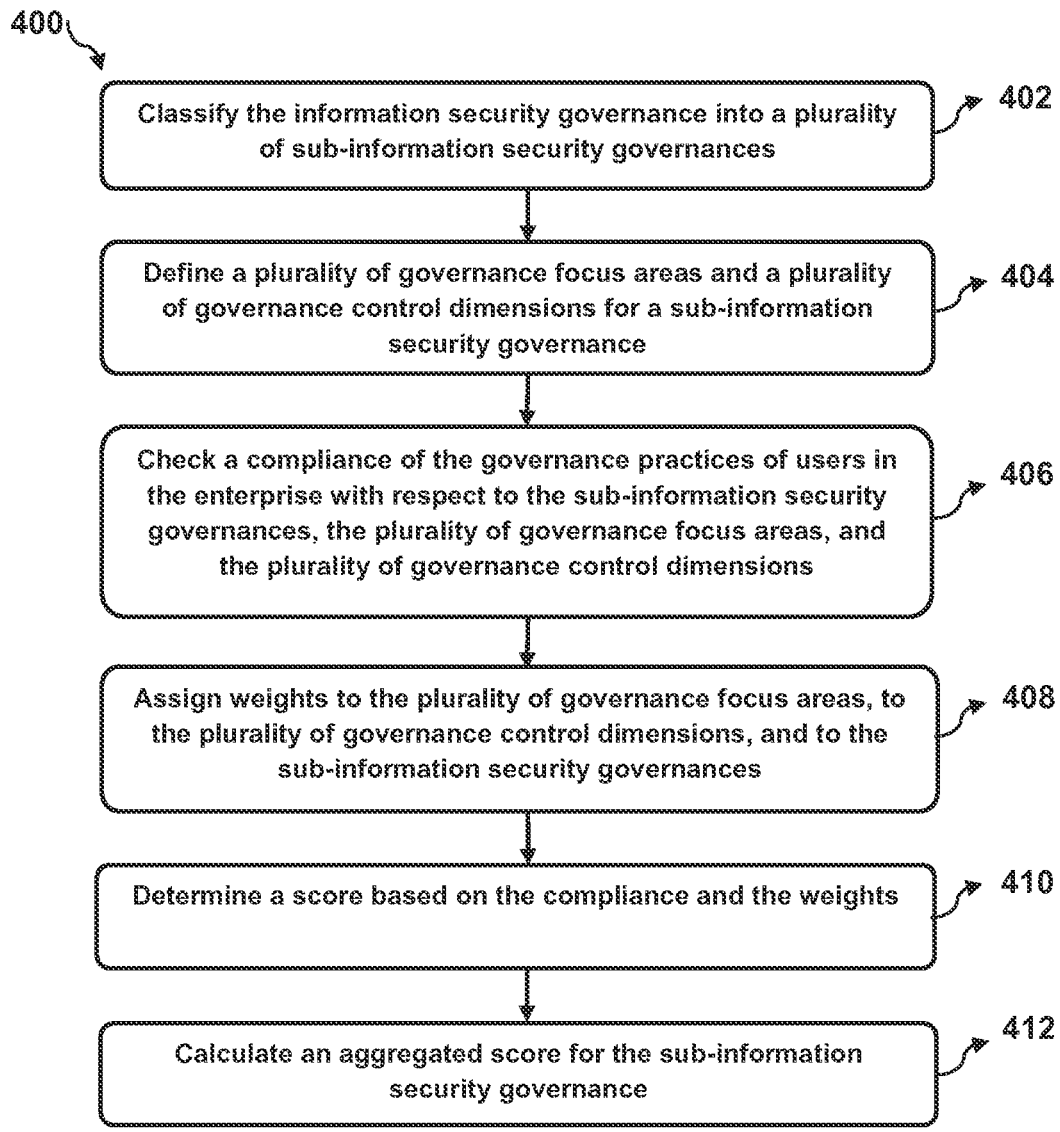
FIG. 4 illustrates a method for assessing an information security governance of an enterprise, in accordance with an embodiment of the present disclosure.

Overall score for the information security Governance = aggregated score of Effective IS Governance + aggregated score Efficient IS Governance + aggregated score of Accountable IS Governance + aggregated score of Responsive IS Governance Referring now to FIG. 4, a method 400 for assessing an information security governance of an enterprise is shown, in accordance with an embodiment of the present disclosure. The method 400 may be described in the general context of computer executable instructions. Generally, computer executable instructions can include routines, programs, objects, components, data structures, procedures, subsystems, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described and is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method may be implemented in any suitable hardware, software, firmware, or combination thereof. However, for ease of explanation, in the embodiments described below, the method 400 may be implemented in the above-described system 102.

At step 402, the information security governance 302 may be classified into a plurality of sub-information security governances 304. The information security governance 302 may indicate governance practices to govern security of information and information assets of the enterprise. In one implementation, the information security governance 302 may be classified by the classifier 210.

At step 404, a plurality of governance focus areas 306 and a plurality of governance control dimensions 308 for a sub-information security governances 304 may be defined. In one implementation, the plurality of governance focus areas 306 and the plurality of governance control dimensions 308 for the sub-information security governances 304 may be defined by the definer 212.

At step 406, a compliance of the governance practices of users in the enterprise may be checked with respect to a) the sub-information security governances 304, b) the plurality of governance focus areas 306, and c) the plurality of governance control dimensions 308. The compliance may be checked by presenting an information security governance questionnaire to the users. The complying further comprises receiving responses from the users/employees. In one embodiment, the responses may be received from two or more users/employees. For the responses received from two or more users/employees, an average may be obtained to determine the value based on the responses. In one implementation, the compliance may be checked by the checker 214.

At step 408, weights may be assigned to the plurality of governance focus areas 306, to the plurality of governance control dimensions 308, and to the sub-information security governances 304. In one implementation, the weights may be assigned by the assigner 216.

At step 410, a score may be determined for each sub-information security governance in each governance focus area and in each governance control dimension based on the compliance and the weights. In one implementation, the score may be determined by the determiner 218.

At step 412, an aggregated score may be calculated for the sub-information security governances by aggregating the score of each of the governance focus area in each of the governance control dimension based on the compliance and the weights. In one implementation, the aggregated score may be calculated by the determiner 218. The aggregated score facilitates assessment of the information security governance of the enterprise.

The aggregated score as described for the sub-information security governance of an enterprise may be compared with another enterprise. Similarly, the overall score of the enterprise may be compared with another enterprise. Further, the overall score may be compared with a benchmark for the information security governance across various enterprises.

Although implementations of system and method for assessing the information security governance of the enterprise have been described in language specific to structural features and/or methods, it is to be understood that the appended claims are not necessarily limited to the specific features or methods described. Rather, the specific features and methods are disclosed as examples of implementations for assessing the information security governance.

We claim:

1. A computer implemented method for assessing an information security governance of an enterprise, the method comprising:

classifying, by a processor, the information security governance into a plurality of sub-information security governances, wherein the information security governance is indicative of governance practices to govern security of information and information assets of the enterprise;

defining, by the processor, a plurality of governance focus areas and a plurality of governance control dimensions for a sub-information security governance, wherein the plurality of governance focus areas are indicative of governance areas relevant to the sub-information security governance, and wherein the plurality of governance control dimensions are indicative of governance actions required on the plurality of governance focus areas, wherein the governance control dimensions comprises of a preventive dimension, a detective dimension, and a reactive dimension;

checking a compliance, by the processor, of the governance practices of users a) in the sub-information security governances, b) in the plurality of governance focus areas, and c) in the plurality of governance control dimensions;

assigning, by the processor, weights to each of the plurality of governance focus areas, to each of the plurality of governance control dimensions, and to the sub-information security governances;

determining, by the processor, a score for each sub-information security governance in each governance focus area and in each governance control dimension based on the compliance and the weights assigned to the plurality of governance focus areas, the plurality of governance control dimensions, and to the sub-information security governances; and calculating, by the processor, an aggregated score for the sub-information security governance by aggregating the score of each of the governance focus area in each of the governance control dimension based on the compliance and the weights;

calculating, by the processor, a reference score for the sub-information security governance by aggregating the weights assigned to the sub-information security governance, the plurality of governance focus areas, the governance control dimensions and the maximum value obtained for the compliance;

assessing, by the processor, the effective information security governance of the enterprise based on the calculated aggregated score for each of the sub-information security governance and the calculated reference score for each of the sub-information security governance.

2. The method of claim 1, wherein the checking compliance further comprises presenting an information security governance questionnaire to the users.

3. The method of claims 1 and 2, further comprising receiving responses from the users based on the information security governance questionnaire.

4. The method of claim 3, further comprising determining a value based on the responses.

5. The method of claim 1, further comprising comparing the aggregated score with a reference score.

6. The method of claim 1, wherein the plurality of sub-information security governances comprise an effective information security governance, an efficient information security governance, an accountable information security governance, and a responsive information security governance.

7. The method of claim 1, wherein the plurality of governance focus areas are an information security awareness, an information security culture, an information security decision making, an information security management, an information security strategy, an information security policy, information security roles and responsibilities, and an information security competence.

8. A system for assessing an information security governance of an enterprise, the system comprising:
a processor; and
a memory coupled to the processor, wherein the processor executes a plurality of modules stored in the memory, and wherein the plurality of modules comprising:
a classifying module to classify the information security governance into a plurality of sub-information security governances, wherein the information security governance is indicative of governance practices to govern security of information and information assets of the enterprise;
a defining module to define a plurality of governance focus areas and a plurality of governance control dimensions for a sub-information security governance, wherein the plurality of governance focus areas are indicative of governance areas relevant to the sub-information security governances, and wherein the plurality of governance control dimensions are indicative of governance actions required on the plurality of governance focus areas, wherein the governance control dimensions comprises of a preventive dimension, a detective dimension, and a reactive dimension;
a checking module to check a compliance of the governance practices of users a) in the sub-information security governances, b) in the plurality of governance focus areas, and c) in the plurality of governance control dimensions;
an assigning module to assign weights to each of the plurality of governance focus areas, to each of the plurality of governance control dimensions, and to the sub-information security governances; and
a determining module to:
determine a score for each sub-information security governance in each governance focus area and in each governance control dimension based on the compliance and the weights assigned to the plurality of governance focus areas, the plurality of governance control dimensions, and to the sub-information security governance; and
calculate an aggregated score for the sub-information security governance by aggregating the score of each of the governance focus area in each of the governance control dimension based on the compliance and the weights
calculate a reference score for the sub-information security governance by aggregating the weights assigned to the sub-information security governance, the plurality of governance focus areas, the governance control dimensions and the maximum value obtained for the compliance;
assess the effective information security governance of the enterprise based on the calculated aggregated score for each of the sub-information security governance and the calculated reference score for each of the sub-information security governance.

9. The system of claim 8, wherein the checking module presents an information security governance questionnaire to the users.

10. The system of claims 8 and 9, wherein the checking module receives responses from the users based on the information security governance questionnaire.

11. The system of claim 8, wherein the checking module further determines a value based on the responses.

12. The system of claim 11, wherein the checking module compares the value with a reference value.

13. The system of claim 8, wherein the determining module compares the aggregated score with a reference score.

14. The system of claim 8, wherein the plurality of sub-information security governance comprise an effective information security governance, an efficient information security governance, an accountable information security governance, and a responsive information security governance.

15. The system of claim 8, wherein the plurality of governance focus areas are an information security awareness, an information security culture, an information security decision making, an information security management, an information security strategy, an information security policy, information security roles and responsibilities, and an information security competence.

16. A non-transitory computer readable medium embodying a program executable in a computing device for assessing an information security governance of an enterprise, the program comprising:
a program code for classifying the information security governance into a plurality of sub-information security governances, wherein the information security governance is indicative of governance practices to govern security of information and information assets of the enterprise;
a program code for defining a plurality of governance focus areas and a plurality of governance control dimensions for a sub-information security governance, wherein the plurality of governance focus areas are indicative of governance areas relevant to the sub-information security governances, and wherein the plurality of governance control dimensions are indicative of governance actions required on the plurality of governance focus areas, wherein the governance control dimensions comprises of a preventive dimension, a detective dimension, and a reactive dimension;
a program code for checking a compliance of the governance practices of users a) in the sub-information security governances, b) in the plurality of governance focus areas, and c) in the plurality of governance control dimensions;
a program code for assigning weights to the plurality of governance focus areas, to the plurality of governance control dimensions, and to the sub-information security governances;
a program code for determining a score for each sub-information security governance in each governance focus area and in each governance control dimension based on the compliance and the weights assigned to the plurality of governance focus areas, the plurality of governance control dimensions, and to the sub-information security governances; and
a program code for calculating an aggregated score for the sub-information security governance by aggregating the score of each of the governance focus area in each of the governance control dimension based on the compliance and the weights;
a program code for calculating a reference score for the sub-information security governance by aggregating the weights assigned to the sub-information security governance, the plurality of governance focus areas, the governance control dimensions and the maximum value obtained for the compliance;

a program code for assessing the effective information security governance of the enterprise based on the calculated aggregated score for each of the sub-information security governance and the calculated reference score for each of the sub-information security governance.

* * * * *